United States Patent [19]

Smith

[11] 4,213,041
[45] Jul. 15, 1980

[54] MASTER CARDS FOR HECTOGRAPHIC PRINTING

[75] Inventor: Colin H. S. Smith, Cambridge, England

[73] Assignee: Data Card (U.K.) Limited, Hampshire, England

[21] Appl. No.: 897,195

[22] Filed: Apr. 17, 1978

[30] Foreign Application Priority Data

Apr. 20, 1977 [GB] United Kingdom ............... 16321/77

[51] Int. Cl.² .................... G06K 19/00; G11B 25/04; B41M 5/00; G06K 19/02
[52] U.S. Cl. .................... 235/487; 101/463.1; 235/488; 235/493; 360/2
[58] Field of Search ............ 101/131, 463, 468; 235/495, 488, 433, 92 SB, 432, 483, 491, 487, 493; 209/547; 360/2

[56] References Cited

U.S. PATENT DOCUMENTS

| | | | |
|---|---|---|---|
| 2,673,033 | 3/1954 | Gruver | 235/432 |
| 3,669,019 | 6/1972 | Barbouh | 101/463 |
| 3,689,742 | 9/1972 | Kagari | 235/92 SB |
| 3,800,124 | 3/1974 | Walsh | 235/488 |
| 3,800,315 | 3/1974 | Budrose | 360/2 |
| 3,804,005 | 4/1974 | Burger | 235/433 |
| 3,935,430 | 1/1976 | Anderson | 209/547 |
| 4,058,839 | 11/1977 | Darjany | 360/2 |

Primary Examiner—Robert M. Kilgore
Attorney, Agent, or Firm—Lawrence E. Laubscher

[57] ABSTRACT

A master card for use in a hectographic printing machine, comprises two layers of snythetic plastics material, having respective apertures therein which are aligned with each other to form a window, and a layer of carbon-receiving material between the synthetic plastics layers and closing the window. The card has an information-carrying zone including opaque areas into which holes can be punched to form transparent areas arranged in predetermined positions to provide information readable by light transmission, and a strip of magnetic material which is machine programmable by magnetization and machine readable.

13 Claims, 2 Drawing Figures

MASTER CARDS FOR HECTOGRAPHIC PRINTING

BACKGROUND OF THE INVENTION

This invention relates to master cards for hectographic printing.

One form of previously proposed card is made of thin paper board or heavy paper having a panel on to which information, for example a name and address, is transferred from a carbon, typically using a conventional typewriter. Such cards are normally fed singly from the bottom or end of a feed stack through a slot, the size of which permits only one card at a time to pass through, into a hectographic printing machine. After some use the cards become worn, and particularly the edges become bent, with the result that the cards are difficult to feed singly through the slot into the printing machine, the bottom card tending to become jammed due to the bending of its edges.

SUMMARY OF THE INVENTION

One feature of the present invention aims to overcome this problem and provides a master card for use in a hectographic printing machine, comprising two layers of synthetic plastics material, having respective apertures therein which are aligned with each other to form a window, and a layer of carbon-receiving material between the synthetic plastics layers and closing the window.

In use, the card can be inserted in a conventional typewriter and information may be transferred from a carbon to the carbon-receiving layer which is visible and accessible through the apertures in the plastics layers.

Preferably the carbon-receiving layer has the same outer peripheral dimensions as the synthetic plastics layers and has a thickness of 0.004 inches. Each of the plastics layer preferably has a thickness of about 0.003 inches. The outer surface of at least one of the plastics layers is preferably textured. The synthetic plastics material is preferably polyvinyl chloride and the carbon-receiving layer is preferably paper and in a preferred embodiment is a pure wood pulp cellulose paper having a weight of preferably from 60 to 100 g/m$^2$, preferably 80 g/m$^2$.

The previously proposed cards are generally used until the print transferred from the card is no longer of acceptable quality, or until the cards become so bent that they no longer feed properly from the bottom of a stack of cards.

In accordance with another aspect of the present invention, there is provided a master card for use in a hectographic printing machine, comprising a strip of magnetic material which is machine programmable by magnetization and machine readable.

The magnetic strip may be programmed with a maximum number of print operations of the card so that when utilized with a machine which can read the magnetic strip the machine can reject the card when the predetermined number of print operations has been attained. Such a machine is described in our co-pending British patent application No. 16230/77. Thus, the card can have a fixed life which is less than the expected life of the card in normal use so that the card does not normally deteriorate markedly during its fixed life.

Furthermore, previously proposed cards have been provided with coded information-bearing areas which rely on light reflecting and sensing means in the printing machine to sense the information carried by the card. The sensing means may, for example, be a light source and photodetector located on the same side of the card. Such cards have the problem that sensing is sometimes difficult because of the similarity of the reflective properties of the material of the card and the data on the card.

A further aspect of the present invention aims to overcome the last-mentioned problem and provides a master card for use in a hectographic printing machine, comprising an information-carrying zone including opaque areas into which holes can be punched to form transparent areas arranged in predetermined positions to provide information readable by light transmission.

Information on the card is readable by any suitable light-transmitting and detecting means, for example a light source and light detector arranged in the printing machine on opposite sides of the zone on the card.

BRIEF DESCRIPTION OF THE FIGURES

A master card in accordance with the invention for a hectographic printing machine will now be described, by way of example, with reference to the accompanying drawings, in which.

DETAILED DESCRIPTION

Figure 1:
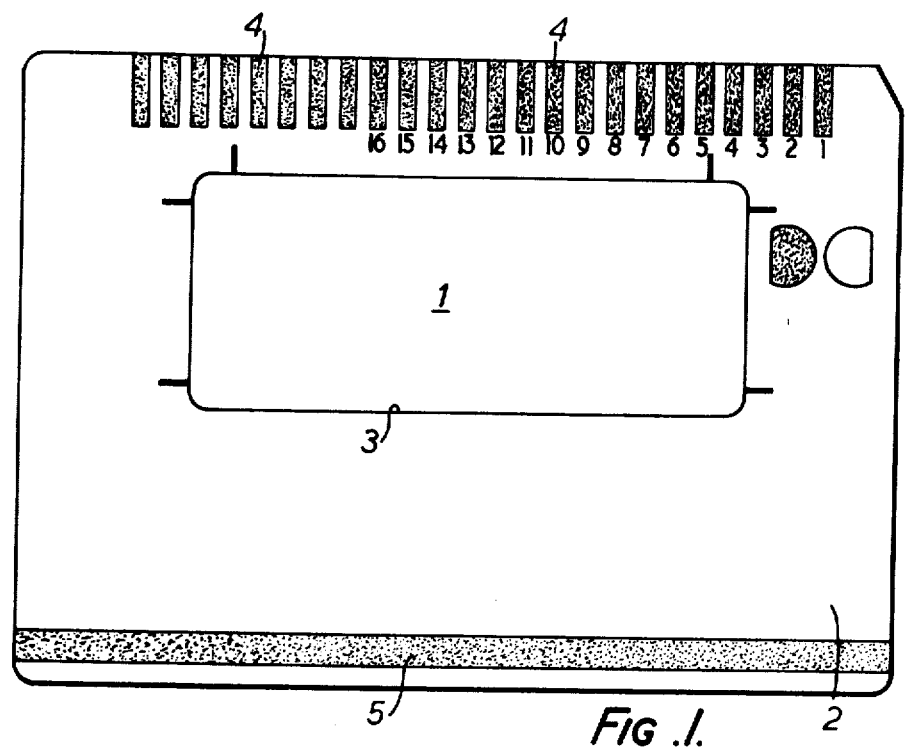
FIG. 1 is a plan view of the card.
Figure 2:
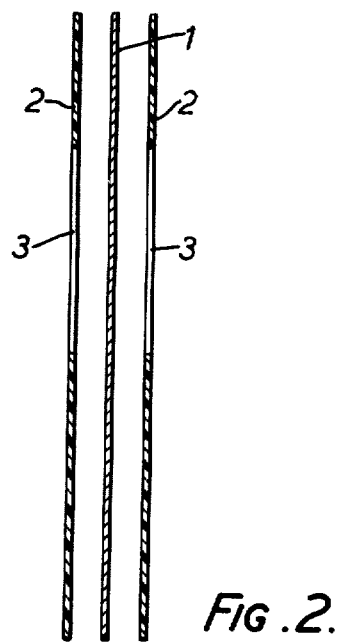
FIG. 2 is a transverse cross-section illustrating the constituent layers before bonding together.

The card described below is particularly suited for use with the hectographic printing machine described in the Specification of our co-pending British patent application No. 16230/77.

The card comprises a layer of paper 1 sandwiched between two layers of synthetic plastics material 2 and bonded thereto by any suitable means, for example by heat and pressure or by adhesive. Each synthetic plastics layer 2 has an aperture or window 3, the apertures being aligned with each other so that the paper is visible on each side of the card. Information may be printed on to the paper using a suitable carbon and conventional typewriter, as is known.

Although the thickness of the paper and synthetic plastics material layers may be chosen to suit a particular application, it is preferred that the thickness of the paper layer is about 0.004 inches, and the thickness of each synthetic plastics layer is about 0.003 inches which provides considerable strength in comparison with previously proposed cards made out of heavy paper, paperboard, cardboard or the like, but permits hectographic printing from the inner paper layer 1 to a surface of a receiver, for example an envelope.

The synthetic plastics material is preferably PVC, although other suitable materials may be used, and the outer surface of one or both PVC layers is preferably textured. The textured surface provides a good grip by feed rollers in a hectographic printing machine which feed the card to a print station and also ensures that there is less "wringing", i.e. sticking together of the cards, than with high gloss surfaces. In addition, the surface can be written upon using normal writing implements, for example a ball-point pen or a pencil. Thus the card can have on it written information as well as other information as will be described below.

The paper layer is preferably a pure wood pulp cellulose paper which provides suitable absorbency to accept the information from a hectographic carbon, such paper being readily adhered to PVC. A preferred paper has a weight of 80 g/m². However, other suitable papers could be used.

The card has along one edge a plurality of opaque bars 4 printed thereon using suitable non-light transmitting ink. The bars 4 are provided for use with a light-transmitting sensing system in a hectographic printing machine having a light source and a receiver arranged on opposite sides of the card.

Additionally, the card has a strip 5 of magnetic material extending along its length. The strip may be provided by any suitable means, for example magnetic ink, but preferably the strip is a self-adhesive tape. Such tape may be magnetized to indicate, for example, a predetermined maximum number of uses of the card, the tape being preferably marked with that maximum number of uses during manufacture.

Although the card can have any desired number of bars 4 to suit a particular application, the illustrated card has 24 bars for use with an 8 point system as described more fully in the Specification of co-pending British patent application No. 16230/77.

Briefly, the first eight bars control the reading of the magnetic strip 5 to determine whether or not the card has already performed its maximum number of print operations. If the card has performed its maximum number of print operations it is rejected and cannot again be used in the machine.

The first sixteen bars carry any information desired for a particular application, the middle eight bars not being used for magnetic encoding. The information is in the form of punched holes detectable by light transmission. For example, in the office of an Estate Agent, the address in the panel could be that of a client and the information in the 1st to 16th bar could be the type of property sought by that client, for example the number of bedrooms required, the price range etc.

After reading the 16th bar, the decision as to whether to print or not is taken by the machine and the card is either held for printing or rejected.

The 17th to 24th bar control the magnetic writing of the strip 5. If the card is to be used for printing, the strip is marked with the number of print operations which the card is to be immediately used for, the previous number being erased and the new number overwriting the previous number. When the card is next used, the total number of print operations of the card will be read and if the number corresponds to the maximum permissable, then the card will be rejected and unusable.

Thus, the information carried by the card can be selectively read to accept or reject the card for printing an envelope for mailing details of, in the case of an Estate Agent, suitable property to a client.

The life of the above-described card is not dependent on a machine operator and not only is the card sturdy to reduce possible damage during wear and tear of the card and therefore reduce possible jamming of the card feed apparatus due to bending of the edges or other part of the card, but the card has a set life and is rejected before the quality of the print from the card becomes unacceptable.

What we claim is:

1. A method for making a master card for use in a hectographic printing machine, comprising the steps of
   (a) securing a layer of carbon receiving paper material between a pair of layers of synthetic plastic material, said layers of synthetic plastic material containing aligned window apertures, respectively, said paper layer extending completely across said aligned window apertures;
   (b) applying a magnetically encoded strip on the outer surface of one of said synthetic plastic layers; and
   (c) printing a plurality of information-bearing spaced opaque bars on said outer surface, whereby said card may be used to control the operation of a hectographic printing machine.

2. A method as defined in claim 1, wherein said opaque bars are printed adjacent one edge of said surface and extend inwardly therefrom.

3. A generally planar master card for use in a hectographic printing machine, comprising
   (a) a layer of carbon receiving material; and
   (b) first and second layers of synthetic plastic material bonded to and in contiguous relation with opposite sides of said paper layer, respectively;
   (c) said layers of synthetic plastic material containing aligned window apertures, respectively, said paper layer extending completely across said aligned window apertures, whereby the card may be used to control the operation of a hectographic printing machine.

4. A generally planar master card for use in a hectographic printing machine, comprising
   (a) a layer of carbon receiving material; and
   (b) first and second layers of synthetic plastic material bonded to and in contiguous relation with opposite sides of said paper layer, respectively;
   (c) said layers of synthetic plastic material containing aligned window apertures, respectively, said paper layer extending completely across said aligned window apertures;
   (d) the outer surface of one of said synthetic plastic layers including
      (1) a strip of magnetically encoded material; and
      (2) an information bearing zone including an opaque area containing a plurality of information apertures passing completely through said first and second plastic layers and said carbon receiving material, said apertures being arranged in a predetermined encoded pattern, whereby the card may be used to control the operation of a hectographic printing machine wherein information is read from the card via light transmission through said information apertures.

5. A master card as defined in claim 4, wherein the outer surface of at least one of said synthetic plastic layers is textured.

6. A master card as defined in claim 5, wherein each of said synthetic plastic layers has a thickness generally equal to 0.003 inches, respectively.

7. A master card as defined in claim 6, wherein said carbon receiving material has a thickness generally equal to 0.004 inches.

8. A master card as defined in claim 7, wherein said carbon receiving material comprises pure wood pulp cellulose paper.

9. A master card as defined in claim 8, wherein said paper has a density of generally 80 g/m².

10. A master card as defined in claim 4, wherein said strip is encoded to indicate a predetermined maximum number of hectographic printing operations of the card in the hectographic printing machine.

11. A master card as defined in claim 10, wherein said strip comprises magnetic ink.

12. A master card as defined in claim 10, wherein said strip comprises self-adhesive magnetic tape.

13. A master card as defined in claim 10, wherein said opaque area comprises a plurality of spaced opaque bars adjacent one edge of said card and extending inwardly therefrom.

* * * * *